(12) United States Patent
May et al.

(10) Patent No.: US 11,442,909 B2
(45) Date of Patent: Sep. 13, 2022

(54) DATA ANALYTICS SYSTEM

(71) Applicant: MOTOROLA SOLUTIONS, INC., Schaumburg, IL (US)

(72) Inventors: Philip E. May, Palatine, IL (US); Juana E. Nakfour, Hawthorn Woods, IL (US); Michael D. Pearce, Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 451 days.

(21) Appl. No.: 14/955,277

(22) Filed: Dec. 1, 2015

(65) Prior Publication Data
US 2017/0154058 A1    Jun. 1, 2017

(51) Int. Cl.
*G06F 16/215*   (2019.01)
*G06F 16/2457*   (2019.01)

(52) U.S. Cl.
CPC ........ *G06F 16/215* (2019.01); *G06F 16/2457* (2019.01); *G06F 16/24578* (2019.01)

(58) Field of Classification Search
CPC ......... G06F 17/30303; G06F 17/30522; G06F 17/3053
USPC ...................................................... 707/728
See application file for complete search history.

(56) References Cited

U.S. PATENT DOCUMENTS

| | | | |
|---|---|---|---|
| 6,590,507 B2 | 7/2003 | Burns | |
| 8,015,135 B2 | 9/2011 | Menich | |
| 8,484,693 B2 | 7/2013 | Cox et al. | |
| 8,639,645 B2 | 1/2014 | Deshpande et al. | |
| 9,063,930 B2 | 6/2015 | Zadeh | |
| 2006/0158329 A1* | 7/2006 | Burkley | H04W 4/90 340/539.13 |
| 2009/0043812 A1 | 2/2009 | Rigdon | |
| 2012/0260263 A1 | 10/2012 | Edoja | |
| 2013/0031041 A1 | 1/2013 | Maciejewski et al. | |
| 2014/0188993 A1* | 7/2014 | Klein | G06Q 10/063 709/204 |

(Continued)

FOREIGN PATENT DOCUMENTS

GB        2452025        2/2009

OTHER PUBLICATIONS

PCT/US2016/059730 International Search Report and Written Opinion of the International Searching Authority dated Jan. 20, 2017 (11 pages).

(Continued)

*Primary Examiner* — James Trujillo
*Assistant Examiner* — J Mitchell Curran
(74) *Attorney, Agent, or Firm* — Michael Best & Friedrich LLP (57) ABSTRACT

A data analytics system. The data analytics system includes a communication processor configured to communicate with one or more remote electronic devices, and one or more electronic processors electrically coupled to the communication processor. The one or more electronic processors are configured to receive a first data from the one or more electronic devices, generate a determination including a first confidence level based on the first data, identify additional data which would increase the first confidence level; request the additional data, receive responses including the additional data, and generate a second confidence level of based on the second data.

8 Claims, 5 Drawing Sheets

(56) References Cited

U.S. PATENT DOCUMENTS

| | | | |
|---|---|---|---|
| 2014/0368659 A1 | 12/2014 | Pandey et al. | |
| 2015/0254307 A1* | 9/2015 | Johnson | G06F 16/2425 707/763 |
| 2016/0148490 A1* | 5/2016 | Barnes | G08B 25/016 455/404.1 |
| 2016/0157032 A1* | 6/2016 | Kane | G08B 25/016 381/56 |
| 2017/0069189 A1* | 3/2017 | Corum | G08B 21/02 |

OTHER PUBLICATIONS

Siegle, "Confidence Intervals and Levels," Educational Research Basics, Jan. 20, 2001, 1 page, University of Connecticut, http://researchbasics.education.uconn.edu/confidenceintervalsandlevels/.

Examination Report issued by the United Kingdom Intellectual Property Office for Application No. 1807207.4 dated Jan. 21, 2021 (3 pages).

* cited by examiner

DATA ANALYTICS SYSTEM

BACKGROUND OF THE INVENTION

Real-time data analytics engines take in data and make a determination based on that data. A confidence level may be assigned to the determination based on the type and quality of data input to the data analytics engine. The confidence level will be less than one hundred percent (100%) due to uncertainty or missing information. The data analytics engine may know what data is lacking and/or missing that would increase the confidence level.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of operating a data analytics system. The method includes receiving a first data from one or more electronic devices, generating a first determination including a first confidence level based on the first data, identifying additional data which would increase the first confidence level, requesting, via a communication processor, the additional data from the one or more electronic devices, receiving responses including the additional data, via the communication processor, from the one or more electronic devices, and generating a second confidence level based on the additional data.

Another embodiment provides a data analytics system. In one particular instances, the data analytics system includes a communication processor and one or more electronic processors. The communication processor is configured to communicate with one or more remote electronic devices through one or more communications networks. The one or more electronic processors are electrically coupled to the communication processor and configured to receive a first data from the one or more electronic devices, generate a determination including a first confidence level based on the first data, identify additional data which would increase the first confidence level; request, via the communication processor, the additional data from the one or more electronic devices, receive responses including the additional data, via the communication processor, from the one or more electronic devices, and generate a second confidence level of based on the additional data.

Figure 1:
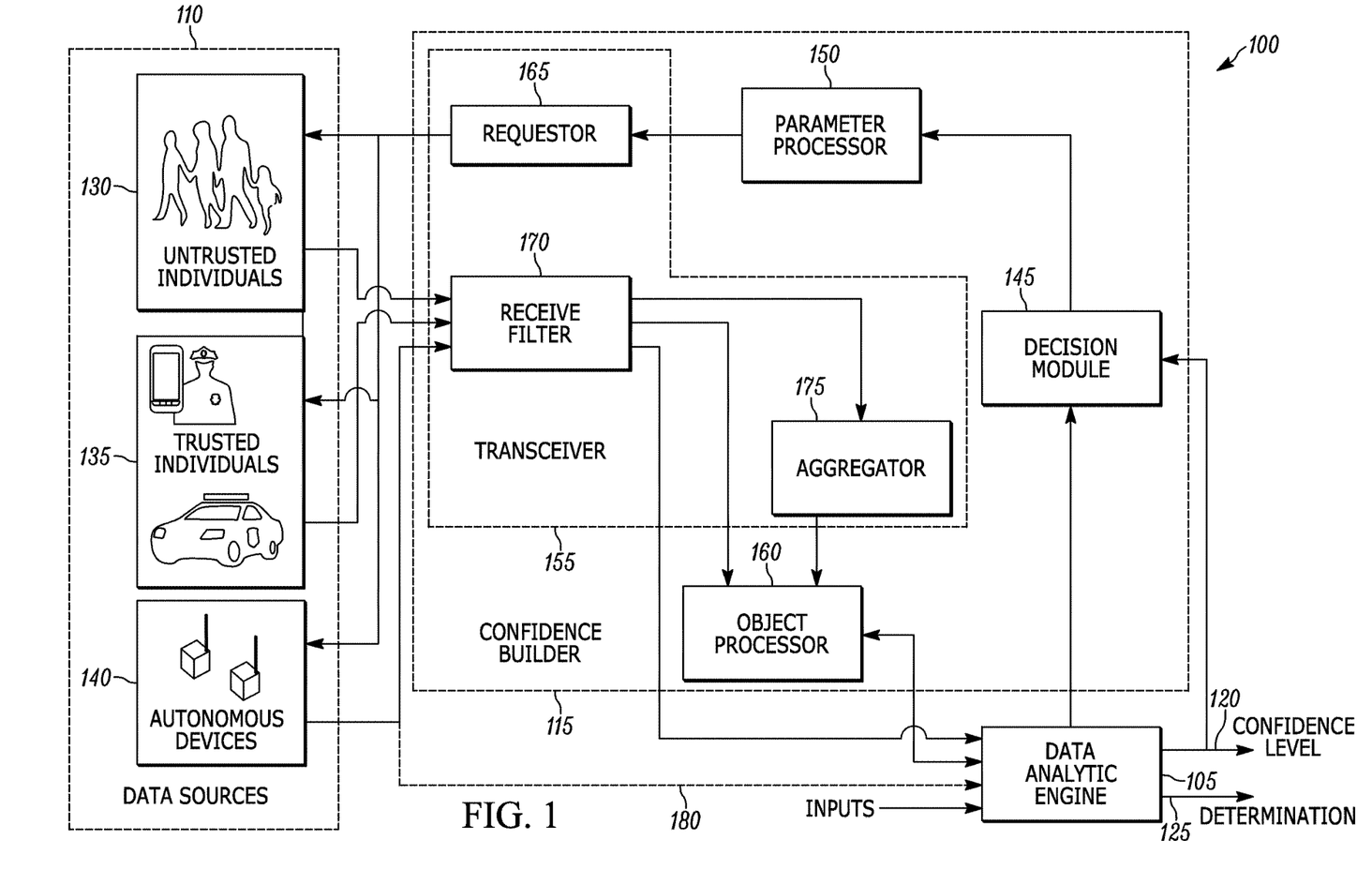
FIG. 1 is a block diagram of a data analytics system in accordance with some embodiments.

FIG. 1 is a block diagram of an exemplary data analytics system 100 for raising the confidence of a determination of a data analytics engine 105. In the example illustrated, the data analytics system 100 determines and acquires data needed to increase an analytics confidence level and/or eliminate or reduce analytics spatial data disparity. In some instances, this is accomplished by:

Identifying data needed to increase analytics confidence and/or eliminating or reducing spatial data disparity.

Identifying related parameters and objects needed to obtain the data.

Identifying instruction sets needed from data source to obtain data.

Identifying most appropriate data source (this includes, for example, proximity, camera angle, role in the incident, etc. . . . )

Identifying most appropriate data extraction method: for example, autonomous or interactive.

Increasing data requests from untrusted sources to eliminate outliers.

Requesting, receiving, and translating data

Updating the data analytics engine.

In one aspect the data analytics system 100 includes one or more mechanisms for detecting when information is missing or uncertain and querying devices (including devices associated with people) to acquire the additional information. In some instances, when sending requests for additional information to devices associated with people, the data analytics system 100 formulates questions directed toward people based on missing or uncertain inputs, directs (i.e., asks) questions to relevant first responders, directs questions to the general public, processes responses from trusted sources (converting these responses into missing information for the analytics), and aggregates or combines responses from untrusted sources (converting the aggregate into missing information for the analytics).

Referring back to FIG. 1, the data analytics engine 105 receives a first data from one or more data sources 110. The data analytics engine 105 uses the first data to generate a determination or result 125. The data analytics engine 105 also generates a confidence level 120 indicative of the level of confidence in the determination 125. The confidence level 120 may be on a scale of zero to one-hundred percent. The one or more data sources 110 may include electronic devices used by untrusted individuals 130, electronic devices used by trusted individuals 135, and autonomous devices 140 (for example, gas sensors, temperature sensors, video cameras, data bases, and the like located at various locations including locations remote from the data analytics engine 105). It will be appreciated that the data sources 110 can include a variety of sources of data including sources of data that are not explicitly mentioned.

In the embodiment illustrated in FIG. 1, the data analytics system 100 also includes a confidence builder 115 for increasing a confidence level 120 of the data analytics engine's 105 determination 125. The data analytics engine 105 also generates a list of additional data that would help in making the determination 125 but that the data analytics engine 105 does not have. The data analytics engine 105 assigns a weight (for example, importance) and a criteria, for example, a threshold level defining when the data is important, a time range in which the data would be relevant, and so forth) for each additional data, and provides these to the confidence builder 115.

The confidence builder 115 includes a decision module 145, a parameter processor 150, a communication processor 155, and an object processor 160. The communication processor 155 includes a requestor 165, a receive filter 170, and an aggregator 175.

The decision module 145 receives the list of additional data s along with their weight and criteria from the data analytics engine 105. Based on the list of additional data s along with their weight and criteria, the decision module 145 determines which data to obtain and when to obtain the data s. When the decision module 145 determines a data should be obtained, the decision module 145 sends the data to be obtained to the parameter processor 150. The parameter processor 150 receives the data to be obtained and determines, as described below, how to obtain the data (that is, creates an object). An object is information relating to how data is obtained. This includes a source of the data, a type of data (for example, streaming video, a picture, a database record, a sensor signal, and so forth), physical location of the data, and so forth.

The parameter processor 150 then sends one or more objects to the requestor 165. The requestor 165 then sends the one or more requests to one or more of the data sources 110. Requests sent to sensors 140 are defined as autonomous requests, and requests sent to untrusted and trusted individuals 130 and 135 are defined as interactive requests. Autonomous requests may result in an autonomous device 140 sending data directly to the data analytics engine 105. Interactive requests are sent to electronic communication devices controlled by the untrusted and trusted individuals 130 and 135. Responses to interactive requests (and potentially autonomous requests) are received by the receive filter 170 which determines if the responses are from electronic devices of trusted individuals 135 or from electronic devices of untrusted individuals 130. Responses from electronic devices of trusted individuals 135 are sent directly to the object processor 160. Responses from electronic devices of untrusted individuals 130 are sent to the aggregator 175 for further processing prior to being sent to the object processor 160. For example, the aggregator 175 may combine several responses from untrusted individuals 130 into a single data unit (for example, an aggregated response) (in some cases adding a confidence level) before forwarding the single data unit to the object processor 160.

An autonomous request is used if there is no person associated with the data, or no person is necessary to acquire the data. Autonomous requests activate a new sensor or another function on an existing sensor or another autonomous data source, using the same data path back to the data analytics engine 105 or flowing through the communication processor 155. An autonomous request may not actually be a request-response pair, instead the newly enabled data may take a direct path 180 back to data analytics engine 105 (see FIG. 1).

An interactive request is used if there is a person associated with the data. The interactive request is sent to an electronic device associated with the person. This may be, for example, a text message, voice call or message, or an interactive alert including selection options or natural language, or a social networking post. For example, if a person can enhance a sensor (for example, point a camera at an item of interest), a request may be sent to them via the most appropriate means (for example, voice call, text message, or interactive alert) telling the person where to move/stand (e.g., a position), what direction to face, and where to point the camera. Replies go back to the communication processor 155 for conversion into additional data. Interactive requests are request-response pairs. Responses to interactive requests are received by the receive filter 170. Responses from the trusted individuals 135 are sent directly to the object processor 160. Responses from untrusted individuals 130 are sent to the aggregator 175 for further processing (for example, statistical processing to create a trusted aggregate response) prior to being sent to the object processor 160.

Requests for additional data are made when the determination confidence level is below a threshold (for example, before acting on a determination, it may be desirable that the confidence level for the determination is greater than seventy-five percent), when potential inputs are missing (for example, the extent of a gas leak cannot be determined because data from some sensors have not been obtained), when known sensors with relevant information are available (for example, gas sensors exist near the gas leak but have not been queried), or when known persons who could corroborate data s are available (for example, safety personnel are known to have arrived at the site of the incident).

The object processor 160 takes the responses (for example, a text message) and converts the responses into a second data (i.e., generates the second data) that the data analytics engine 105 uses to make its determination 125. The data analytics engine 105 uses the second data obtained via the confidence builder 115 along with prior data to generate a second determination 125. The second determination 125 may be the same as the first determination 125, in which case, the added data may increase the confidence of the determination 125 resulting in a second confidence level 120 greater than the first confidence level 120. Should the new data s provide information that proves the first determination wrong or weakens the first determination, the second determination 125 may be different than the first determination 125, and/or the second confidence level 120 may be less than the first confidence level 120.

Elements of the data analytics system 100 (for example, the decision module 145, the parameter processor 150, etc.) may be contained in a single unit (for example, a computer system) or may be distributed over many units (for example, one or more elements of the confidence builder 115 may be part of a unit located in a police vehicle at the scene of an incident). The data analytics system 100 includes one or more processors for executing the functions of each of the elements. Each element may have a processor or several or all of the elements may be operated by a single processor.

Communication between the different elements of the data analytics system 100 may be accomplished by any suitable means including hard wiring, wireless (for example, radio frequency, Wi-Fi, satellite, and so forth), and may operate via the cloud, the Internet, or other suitable communication scheme.

Figure 2A:
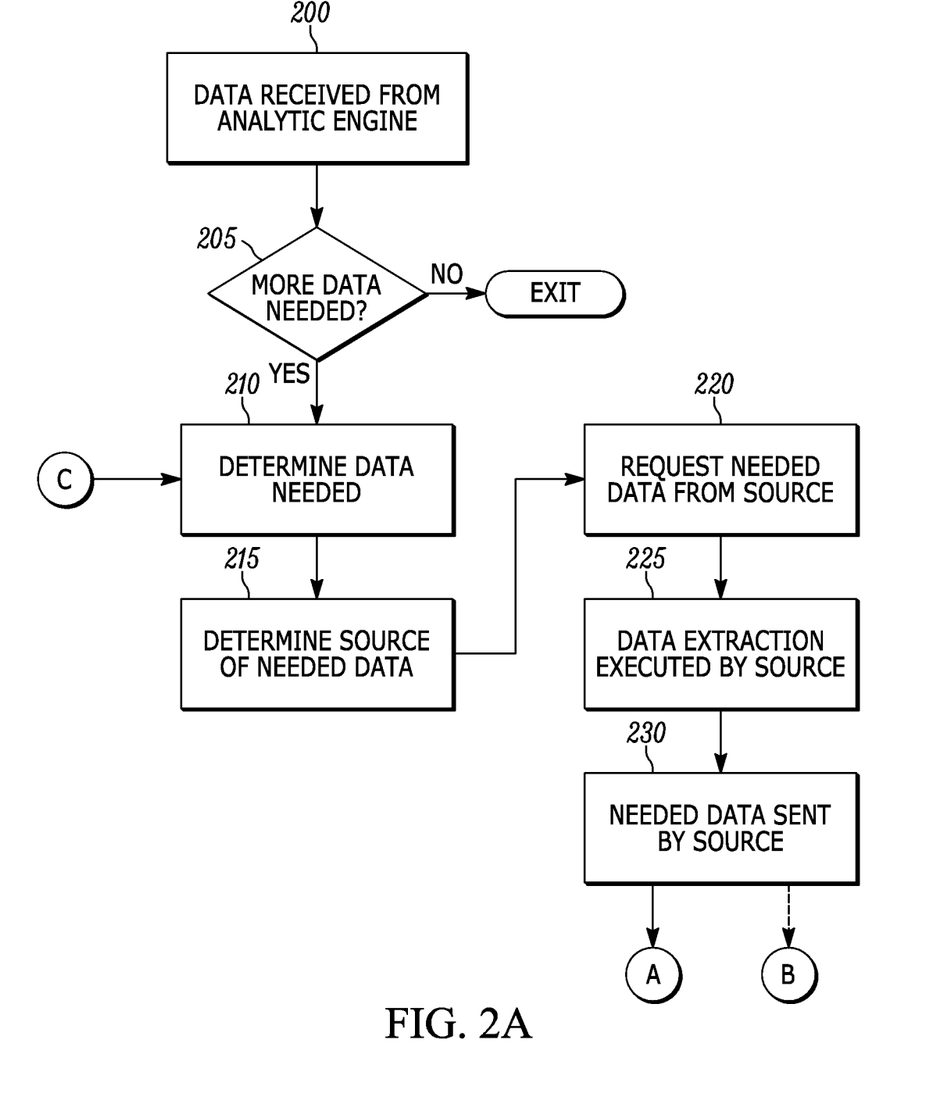
FIGS. 2A and 2B are a flow chart of the operation of a confidence builder in accordance with some embodiments.
Figure 2B:
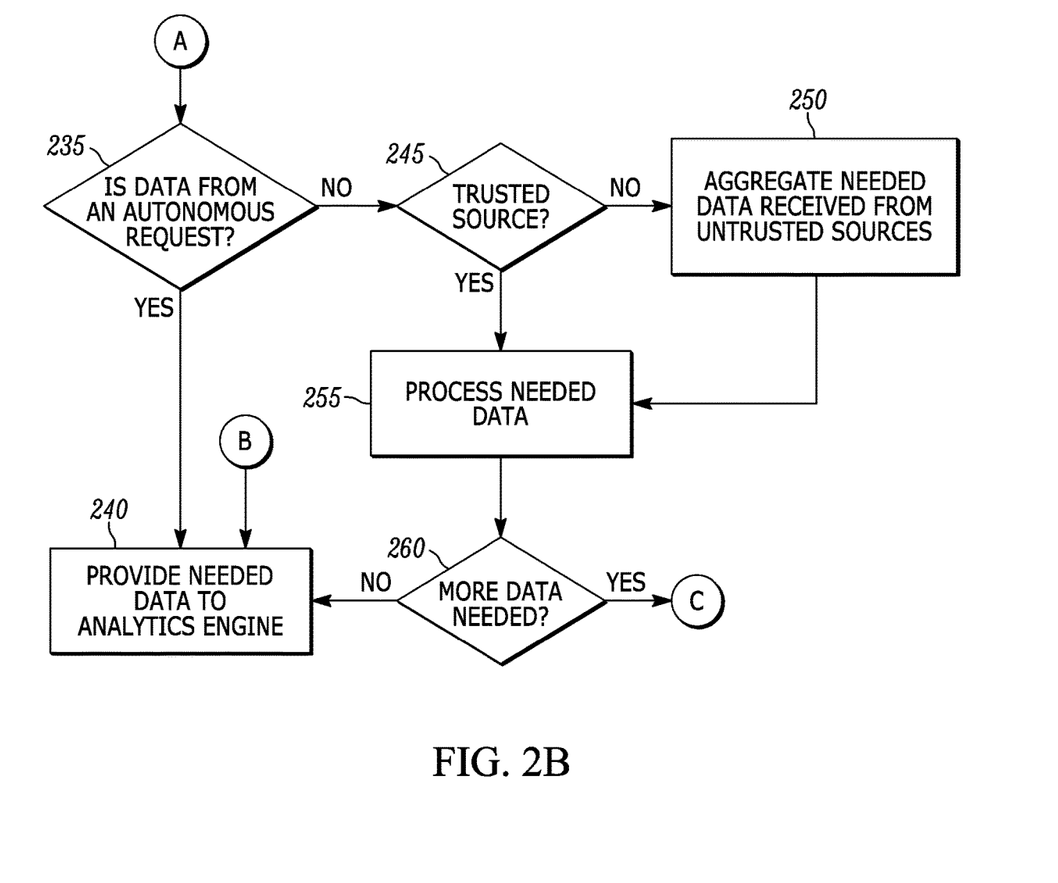

FIGS. 2A and 2B are flow charts of the operation of the data analytics system 100. Additional data desired (for example, critical missing data, weights, location, and criteria for each data) is received by the confidence builder 115 from the data analytics engine 105 (block 200). The decision module 145 determines if more data is needed (that is, checks the confidence level 120 from the data analytics engine 105 against a threshold and whether a data disparity exists) (block 205). When more data is needed, the decision module 145 determines what data is needed to improve the confidence level 120 (block 210). Next the parameter processor 150 determines how to obtain the needed data (that is, sources for the needed data) (block 215). This may involve a list of steps or questions for a person to follow/answer (for example, point a camera at a specific object, e.g., a license plate and take a picture). The parameter processor 150 sends the requestor 165 information on the source and the needed data (that is, the object) (block 220). The requestor 165 sends one or more requests to the selected source(s) (225). The selected source(s) provide the requested data to the receive filter 170 (block 230). Or optionally in the case of an autonomous request, the source send the requested data directly to the data analytics engine 105 (see dashed line in FIGS. 2A and 2B). The receive filter 170 determines if the requested data is from an autonomous device 140 (that is, an autonomous request) (block 235). When the requested data is from an autonomous device 140, the receive filter 170 provides the data directly to the data analytics engine 105 (block 240). If the requested data is not from an autonomous device 140 (that is, from an interactive request), the receive filter 170 determines if the data is from a trusted source 135 (block 245). If the data is from an untrusted source 130, the receive filter 170 sends the data to the aggregator 175 which combines data from several untrusted sources 130 into a single set of data (block 250). The data from trusted sources 135 or from the aggregator 175 is sent to the object processor 160 which converts the data into a form suitable for the data analytics engine 105 (block 255). The object processor 160 also determines if more data is needed (block 260). If not, the object processor 160 then sends the converted data to the data analytics engine 105 which then analyzes the data to provide a new determination 125 or a new confidence level 120 (block 240). Otherwise the operation continues at block 210.

Figure 3:
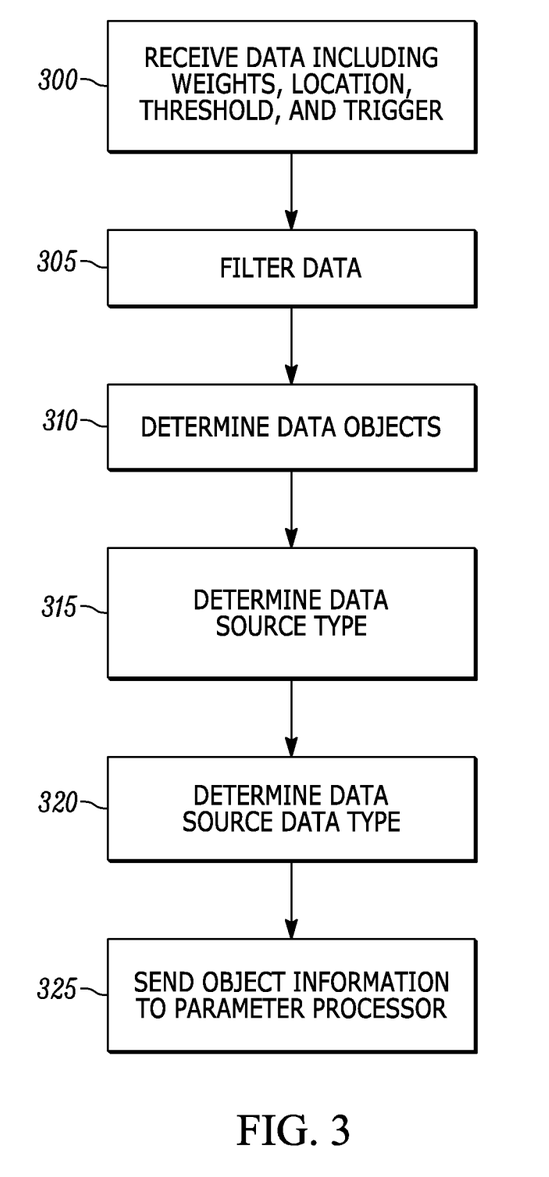
FIG. 3 is a flow chart of the operation to determine needed objects in accordance with some embodiments.

FIG. 3 is a flow chart of the operation of the decision module 145. The decision module 145 receives the additional data along with the weights, location, and criteria for each of the additional data (block 300). The decision module 145 filters the additional data along with the weights, location, and criteria, for each of the additional data to determine the best way to improve the confidence level from the additional data (block 305). The decision module 145 then determines objects (for example, relationships and location needed to obtain the additional data (for example, a suspect's identity is related to the objects of suspect's car license, suspect's facial recognition, and suspect's cell phone identification signal) (block 310). Next, the decision module 145 determines the type of object (for example, sensors, media devices, radio frequency sniffers, and so forth) needed to obtain the additional data (block 315). Finally, the decision module 145 determines the data type of the object (for example, jpeg, mp4, phone IMEI, and so forth) (block 320). The object information is then sent to the parameter processor 150 (block 325).

Figure 4:
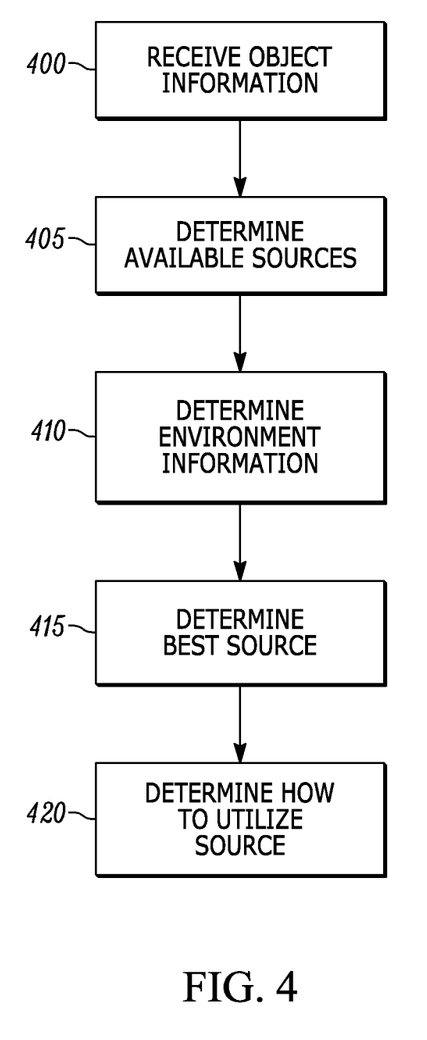
FIG. 4 is a flow chart of the operation to determine an appropriate data source and extract data in accordance with some embodiments.

FIG. 4 is a flow chart of the operation of the parameter processor 150. The parameter processor 150 receives the object information including the objects and their locations (400). The parameter processor 150 then determines data sources 110 available (for example, a responder's equipment such as on-body cameras, environmental sensors, etc., data sources 110 proximity to a target object, people proximate to the target object—people that are active on social media, security personnel, school teachers, school administrators, safety personal such as police and fire professionals, etc.) (405). Next environment information is determined (block 410). Environment information may include incident location (that is, a region of interest), incident type, incident size, incident category, terrain, weather, location and positioning of potential data objects, and so forth. The parameter processor 150 next determines which of the available data sources 110 would provide the best data for improving the confidence level 120 (block 415). Next, the parameter processor 150 determines how to utilize the best data sources 110 for extracting the desired data (block 420). For example, to take a picture of a license plate from angle (x,y,z) the parameter processor 150 decides to ask a responder with an on-body camera to move to x,y face northeast and take a picture at a 30 degree down angle.

Following are two examples of how the data analytics system 100 may operate.

Example 1

A suspect holds a hostage in a commercial building. An incident is created and responders are dispatched to the incident. According to initial parameters reported from incident, responders and social media, the data analytics engine 105 reports a "40% confidence level suspect will kill a hostage.". A blurry picture of the suspect was captured but the identity of the suspect cannot be verified. The data analytics engine 105 passes needed data, weights and confidence level to the confidence builder 115. Among the data with high weight and current low confidence is the identity of the suspect since the picture was blurry. The decision module 145 determines objects related to identity of the suspect, such as a car license, facial recognition, cell phone IMEI, etc. The decision module 145 determines the need to capture all the license plates of cars parked in vicinity of a commercial building near the incident. The license plates of the cars parked in the back side were captured, but none of the driving license pictures of the owners matched the suspect blurred picture. The decision module 145 determines that the license plates of cars parked in front of the building need to be gathered. The parameter processor 150 determines the best trusted and untrusted data source(s) to gather the data, for example, Officer John has the highest data source score to get the data. The parameter processor 150 has the requestor 165 send an interactive request to Officer John to "Move 5 feet and face northwest." Officer John obliges and responds "OK." A photo is taken and sent to the receive filter 170. The receive filter 170 determines the response is from a trusted source (that is, Officer John) and sends the response directly to the object processor 160 for license recognition. The object processor 160 determines the owner of car and compares the driver's license photo to the blurry suspect picture. If the picture matches, the object processor 160 sends the suspect identity to the data analytics engine 105. The data analytics engine 105, based on suspect identity and his criminal history raises the confidence level of the determination that the suspect will kill hostage to 90%.

Example 2

A gas autonomous device 140 detects gas in a building. The data analytics engine 105 determines that a gas leak has occurred at a valve in the building, and has a confidence level of 50% that the valve is leaking. The data analytics engine 105 passes needed data, weights and confidence level to the confidence builder 115. Among the data with high weight and current low confidence is the extent of the leak (for example, how far the gas has spread, how much gas has/is leaking, and so forth) and the actual source of the leak.

The decision module 145 determines the need to capture data from other sensors 140 to determine the how far the gas has spread, and additional data (for example, the density of the gas). The parameter processor 150 determines what sensors 140 are available in the area of the leak and what data the sensors 140 can provide. The parameter processor 150 has the requestor 165 send autonomous requests to the identified sensors 140. Data from the sensors 140 may be sent directly to the data analytics engine 105 or may be sent to the receive filter 170 which sends the data on to the data analytics engine 105. The data analytics engine 105, based on data from the sensors 140 determines that the gas has spread in all directions equally from the valve, raising the confidence level 120 that the gas is leaking from the valve to 90%.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a data analytics system to improve a confidence level in a first determination, the method comprising:
   receiving, via a transceiver, a first data from one or more electronic devices;
   generating the first determination based on the first data;
   generating a first confidence level for the first determination;
   identifying new data not yet captured by the one or more electronic devices that would increase the first confidence level by
      determining, with a parameter processor, data sources available in a region of interest,
      determining which data sources in the region of interest can provide the new data;
   sending, via a communication processor, to the one or more electronic devices an interactive request to gather the new data using the one or more electronic devices, the interactive request including instructions to a person associated with the additional data to perform an action to enable the one or more electronic devices to capture the new data;

receiving a response including the new data, via the communication processor, from the one or more electronic devices;

determining whether each response is from an electronic device controlled by a trusted individual or an electronic device controlled by an untrusted individual;

combining responses from devices controlled by untrusted individuals into an aggregated response; and generating a second confidence level based on the first data and the new data.

2. The method of claim 1, wherein the trusted individuals include safety personnel.

3. The method of claim 1, wherein the action includes at least one selected from a group consisting of pointing a video camera at a specific object, moving to a specific position, facing a specific direction, asking a question, and answering a question.

4. The method of claim 1, further comprising assigning a weight and criteria to each of the additional data.

5. A data analytics system comprising:
- a communication processor configured to communicate with one or more electronic devices through one or more communications networks; and
- one or more electronic processors electrically coupled to the communication processor and configured to:
- receive a first data from the one or more electronic devices,
- generate a determination based on the first data,
- generate a first confidence level for the first determination;
- identify new data not yet captured by the one or more electronic devices that would increase the first confidence level by
- determining, with a parameter processor, data sources available in a region of interest,
- determining which data sources in the region of interest can provide the new data;
- send, via the communication processor, to the one or more electronic devices an interactive request to gather the new data using the one or more electronic devices, the interactive request including instructions to a person associated with the additional data to perform an action to enable the one or more electronic devices to capture the new data;
- receive a response including the new data, via the communication processor, from the one or more electronic devices;
- determine whether each response is from an electronic device controlled by a trusted individual or an electronic device controlled by an untrusted individual;
- combine responses from untrusted devices into an aggregated response; and
- generate a second confidence level based on the additional data.

6. The data analytics system of claim 5, wherein the trusted individuals include safety personnel.

7. The data analytics system of claim 5, wherein the action includes at least one selected from a group consisting of pointing a video camera at a specific object, moving to a specific position, facing a specific direction, asking a question, and answering a question.

8. The data analytics system of claim 5, wherein the one or more electronic processors are configured to assign a weight and criteria to each of the additional data.

* * * * *